United States Patent
Piippo

(10) Patent No.: US 7,098,623 B2
(45) Date of Patent: Aug. 29, 2006

(54) METHOD IN CONNECTION WITH PERMANENT MAGNET SYNCHRONOUS MACHINES

(75) Inventor: Antti Piippo, Espoo (FI)

(73) Assignee: ABB OY, Helsinki (FI)

( * ) Notice: Subject to any disclaimer, the term of this patent is extended or adjusted under 35 U.S.C. 154(b) by 0 days.

(21) Appl. No.: 11/258,151

(22) Filed: Oct. 26, 2005

(65) Prior Publication Data

US 2006/0091847 A1 May 4, 2006

(30) Foreign Application Priority Data

Oct. 28, 2004 (EP) .................................. 04105346

(51) Int. Cl.
H02P 7/36 (2006.01)
(52) U.S. Cl. ...................... 318/721; 318/701; 318/727; 318/800
(58) Field of Classification Search ................ 318/245, 318/254, 701, 721, 727, 800
See application file for complete search history.

(56) References Cited

U.S. PATENT DOCUMENTS

| | | | |
|---|---|---|---|
| 5,212,438 A * | 5/1993 | Miyazaki et al. | 318/805 |
| 5,387,855 A * | 2/1995 | Miyazaki et al. | 318/805 |
| 5,796,235 A * | 8/1998 | Schrodl et al. | 318/801 |
| 6,163,127 A | 12/2000 | Patel et al. | |
| 6,222,335 B1 * | 4/2001 | Hiti et al. | 318/432 |
| 6,552,508 B1 * | 4/2003 | Ho et al. | 318/727 |
| 6,924,617 B1 * | 8/2005 | Schulz et al. | 318/701 |
| 7,015,667 B1 * | 3/2006 | Patel et al. | 318/432 |
| 2004/0145334 A1 * | 7/2004 | Virtanen | 318/712 |

OTHER PUBLICATIONS

Marco Tursini et al., "Sensorless Control of an IPM Synchronous Motor for City-Scooter Applications". Conference Record of the 2003 IEEE Industry Applications Conference, Oct. 12, 2003, pp. 1472-1479, vol. 3 of 3, conf. 38th IAS Annual Meeting, Salt Lake City, Utah, XP010676190 (cited in the attached European Search Report and in the specification).

Antti Piippo et al., "Sensorless Control of PMSM Drives Using a Combination of Voltage Model and HF Signal Injection", Industry Applications Conference, Oct 3-7, 2004, pp. 964-970, vol. 2, 39th IAS Annual Meeting. Conference Record of the 2004 IEEE, Seattle, WA, USA, X010735124 (cited in the attached European Search Report and in the specification).

(Continued)

Primary Examiner—Paul Ip
(74) Attorney, Agent, or Firm—Buchanan Ingersoll & Rooney PC

(57) ABSTRACT

A method for sensorless estimation of rotor speed and position of a permanent magnet synchronous machine the method comprising the steps of calculating first stator flux vector estimate ($\hat{\psi}_{d,i}+j\hat{\psi}_{q,i}$) using the flux model and measured stator currents, calculating second stator flux vector estimate ($\hat{\psi}_{d,u}+j\hat{\psi}_{q,u}$) using the voltage model and measured stator voltages, comparing the directions of the first and second flux vectors to achieve a first error signal ($F_\epsilon$), using speed adaptation to achieve estimates for the rotor angular speed ($\hat{\omega}_m$) and angular position ($\hat{\theta}_m$) from the first error signal ($F_\epsilon$), injecting a known voltage signal ($u_c$) to the stator voltage, detecting a current signal ($i_{qc}$) from the stator current to form a second error ($\epsilon$) signal, which is dependent on the estimation error of the rotor position, augmenting the voltage model by the second error signal ($\epsilon$) to keep the first and second flux vector estimates aligned and so to correct the rotor angular speed ($\hat{\omega}_m$) and angular position ($\hat{\theta}_m$) estimates.

3 Claims, 1 Drawing Sheet

OTHER PUBLICATIONS

*Ewald Robeischl et al., "Position-Sensorless Biaxial Postion Control With Industrial PM Motor Drives Based on Inform- and Back EMF Model", IEEE IECON'02, Sevilla, Spain, Nov. 2002, pp. 668-673, vol. 1, Vienna University of Technology, Institute of Electrical Drives and Machines, Vienna, Austria (cited in the specification).

*C. Silva et al., "An HF Signal-Injection Based Observer for Wide Speed Range Sensorless PM Motor Drives Including Zero Speed", Proc. EPE'03, vol. 1, Toulouse, France, Sep. 2003, pp. 1-9, School of Electrical and Electrical Engineering, University of Nottingham, Nottingham, NG7 2RD, United Kingdom (cited in the specification).

*Hisao Kubota et al., "DSP-Based Speed Adaptive Flux Observer of Induction Motor", IEEE Transactions on Industrial Applications, vol. 29, No. 2, Mar./Apr. 1993, pp. 344-348 (cited in the specification).

*Gheorghe Daniel Andreescu, "Position and Speed Sensorless Control of PMSM Drives Based on Adaptive Observer", Proc. EPE'99, Sep. 1999, pp. 1-10, Lausanne, Switzerland, "Politehnica" University of Timisoara, Automation and Industrial Informatics Department, Bv. Vasile Parvan 2, 1900 Timisoara, Romania (cited in the specification).

*Matthew J. Corley et al., "Rotor Position and Velocity Estimation for a Salient-Pole Permanent Magnet Synchronous Machine at Standstill and High Speeds", IEEE Transactions on Industry Application, vol. 34, No. 4, Jul./Aug. 1998, pp. 784-789 (cited in the specification).

* cited by examiner

METHOD IN CONNECTION WITH PERMANENT MAGNET SYNCHRONOUS MACHINES

FIELD OF THE INVENTION

This invention relates to method for estimating the position angle and the rotational speed of a sensorless permanent magnet synchronous machine.

BACKGROUND OF THE INVENTION

Vector control of a permanent magnet synchronous motor (PMSM) requires accurate information of the rotor position. The simplest method to determine the required rotor position is to use a mechanical sensor. However, the sensor coupled to the shaft is a mechanical component liable to faults, which increases the price of a motor drive considerably. In addition, as the motor drive control is based on information obtained from the sensor, sensor breakage inevitably causes downtime in said motor drive.

In sensorless control, the rotor speed and position are estimated without mechanical sensors either by a fundamental-excitation method or a high-frequency (HF) signal injection method. Fundamental-excitation methods are based on the dynamic model of the motor, while signal injection methods are based on detecting the anisotropy caused by the saliency of the rotor or by magnetic saturation.

The most common ways in connection with the permanent magnet synchronous machine are based on using various flux observers. The operation of the flux observer is based on a voltage model on a synchronous machine, the model being based on the voltage equation of the machine. The initial values required by the voltage equation are inductances and resistances of the machine.

The voltage models produce an accurate estimate on the angular speed of the rotor at its higher values. However, the voltage models have a drawback that at near-zero speed the estimate obtained by the voltage model becomes inaccurate, due to possibly erroneous parameters and measurement inaccuracies together with a low back EMF produced by the machine.

In signal injection methods an extra signal deviating from the fundamental frequency is injected to the motor either in voltage or in current form. This signal provides in the machine an injection frequency response, from which is obtained by demodulation a position tracking signal that can be used for determining the position of the rotor.

Fundamental-excitation methods, such as methods based on flux or voltage models, have good dynamic properties, but they do not allow sustained operation at low speeds. On the other hand, signal injection methods are well suited to operation at low speeds, including standstill, but tend to have limited dynamic performance. For PMSM drives, approaches for combining a fundamental excitation method and a signal injection method have been presented in references [1]–[4].

The problem associated with the prior art methods for determining the position angle is the inaccuracy especially in low-speed region and in zero speed due to possibly erroneous parameter values and sensitivity to disturbances.

BRIEF DESCRIPTION [DISCLOSURE] OF THE INVENTION

An object of the present invention is to provide a method so as to solve the above problem. The object of the invention is achieved by a method, which is characterized by what is stated in the independent claim. The preferred embodiments of the invention are disclosed in the dependent claims.

In the method of the invention a speed-adaptive observer is used throughout the whole speed range. At low speeds, the estimation is augmented with an HF signal injection method by correcting the stator flux vector alignment. An error signal obtained by the HF signal injection technique stabilizes the adaptive observer at low frequencies.

An advantage of the method of the invention is that it achieves smaller speed and position estimation error and better noise rejection than the prior known methods. The method of the invention results also in an observer having excellent dynamic properties over a wide speed range.

BRIEF DESCRIPTION OF THE DRAWINGS

In the following the invention will be described in greater detail by means of preferred embodiments with reference to the attached drawings, in which.

DETAILED DESCRIPTION OF THE INVENTION

Adaptive Observer

Figure 1:
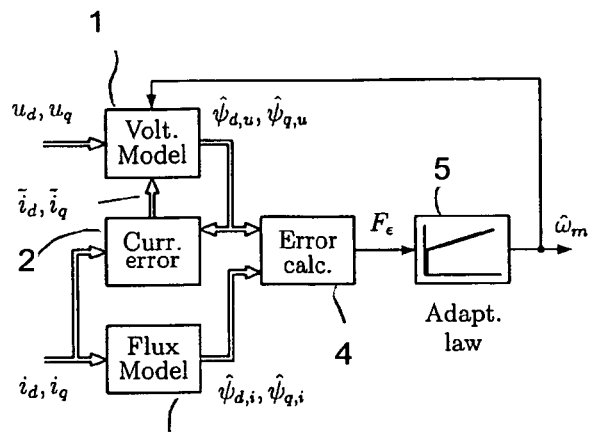
FIG. 1 shows a block diagram of an adaptive observer.

In an adaptive observer shown in FIG. 1, the rotor speed and position estimation is based on flux estimation error between two different models. A speed-adaptive flux observer has been developed for induction motors in [5]. For PMSMs, an adaptive observer has been disclosed in stator coordinates in [6], whereas the approach presented in this description is implemented in rotor coordinates. Estimates for the stator flux are calculated using both the voltage model and the flux model. The error of the two flux vectors is used to adapt the speed estimate so that the flux vectors correspond to each other. For the use in the flux and voltage models, the stator currents and voltages are measured and some parameters for these models are measured or identified.

The stator flux components obtained by the voltage model in the rotor reference frame are $$\frac{d\hat{\psi}_{d,u}}{dt} = u_d - \hat{R}_s \hat{i}_d + \hat{\omega}_m \hat{\psi}_{q,u} + \lambda_{re}\tilde{i}_d - \lambda_{im}\tilde{i}_q \hat{\omega}_m \quad (1a)$$

$$\frac{d\hat{\psi}_{q,u}}{dt} = u_q - \hat{R}_s \hat{i}_q - \hat{\omega}_m \hat{\psi}_{d,u} + \lambda_{re}\tilde{i}_q + \lambda_{im}\tilde{i}_d \hat{\omega}_m \quad (1b)$$

where $$\hat{i}_d = \frac{\hat{\psi}_{d,u} - \hat{\psi}_{pm}}{\hat{L}_d} \quad (2a)$$

$$\hat{i}_q = \frac{\hat{\psi}_{q,u}}{\hat{L}_q} \quad (2b)$$

are the estimates for stator current components and $$\tilde{i}_d = \hat{i}_d - i_d \quad (3a)$$

$$\tilde{i}_q = \hat{i}_q - i_q \quad (3b)$$

are the components of the current estimation error. Estimates are marked by the symbol ^. $\hat{R}_s$ is the estimated stator resistance, $\hat{\omega}_m$ is the estimated rotor angular speed, $\hat{L}_d$ and $\hat{L}_q$ are the estimated direct and quadrature components of stator inductance, $\hat{\psi}_{pm}$ is the presumed value of the permanent magnet flux, which can be obtained from an identification run, and $\lambda_{re}$ and $\lambda_{im}$ are observer gain parameters having effect on the flux amplitude and phase, respectively. The gain parameter $\lambda_{re}$ usually has a value between 0 and $\hat{R}_s$. By selecting $\lambda_{re}=\hat{R}_s$ and $\lambda_{im}=0$, (1) becomes a pure voltage model, while the selections $\lambda_{re}=0$ and $\lambda_{im}=0$ yield a flux estimate that is calculated by using only the stator voltage without any feedback from the measured stator current. The gain parameter $\lambda_{im}$ stabilizes the observer in the regenerative mode, and usually has a negative value. If space vector notation for (1) is used, a complex observer gain $\lambda_{re}+j\hat{\omega}_m\lambda_{im}$ can be used.

The flux model for estimating the stator flux components can be written as $$\hat{\psi}_{d,i}=\hat{L}_d i_d+\hat{\psi}_{pm} \tag{4a}$$

$$\hat{\psi}_{q,i}=\hat{L}_q i_q. \tag{4b}$$

An error signal from the complex flux vectors $\hat{\psi}_{d,u}+j\hat{\psi}_{q,u}$ and $\hat{\psi}_{d,i}+j\hat{\psi}_{q,i}$ can be obtained by different means. Here, the first error signal, which is proportional to the misalignment of the two flux vectors, is obtained by $$F_\varepsilon = \frac{Im\{(\hat{\psi}_{d,u}+j\hat{\psi}_{q,u})^*(\hat{\psi}_{d,i}+j\hat{\psi}_{q,i})\}}{Re\{(\hat{\psi}_{d,u}+j\hat{\psi}_{q,u})*(\hat{\psi}_{d,i}+j\hat{\psi}_{q,i})\}} \tag{5}$$

where * denotes a complex conjugate. This first error signal is fed to a PI-type speed adaptation mechanism $$\hat{\omega}_m = k_i \int F_\varepsilon dt + k_p F_\varepsilon \tag{6}$$

where $k_i$ and $k_p$ are the gains of the speed adaptation. The estimate for rotor position is obtained by integrating $\hat{\omega}_m$.

In FIG. 1 block 1 includes equations (1a, 1b), and receives stator voltage components $u_d, u_q$ and components of the current estimation error $\tilde{i}_d, \tilde{i}_q$ as inputs. The current estimation error is calculated according to equations (2a, 2b, 3a, 3b) in block 2. Block 2 receives as its input the measured stator currents $i_d, i_q$ and stator flux estimates $\hat{\psi}_{d,u}, \hat{\psi}_{q,u}$ calculated using voltage model in block 1. Flux model block 3 includes equations (4a, 4b) and calculates stator flux components $\hat{\psi}_{d,i}, \hat{\psi}_{q,i}$ using the flux model, and outputs these components to the error calculation block 4, which calculates an error between the inputted flux estimates according to equation (5). The first error $F_\varepsilon$ is further fed to an adaptation mechanism 5, which calculates the estimate for the angular speed $\hat{\omega}_m$ of the rotor according to equation (6). This estimate is then fed back to voltage model 1.

High-frequency Signal Injection

An alternating voltage is used for HF signal injection [7]. A carrier excitation signal fluctuating at angular frequency $\omega_c$ and having amplitude $\hat{u}_c$, i.e., $$u_c=\hat{u}_c \cos(\omega_c t) \tag{7}$$

is superimposed on the d component of the stator voltage in the estimated rotor reference frame. An alternating HF current response is detected in the q direction of the estimated rotor reference frame, amplitude modulated by the rotor position estimation error. The q component of the measured current is band-pass filtered (BPF), giving the current signal $i_{qc}$ varying at the signal injection frequency. The current signal is then demodulated and low-pass filtered (LPF) to extract a second error signal $$\epsilon=LPF\{i_{qc}\sin(\omega_c t)\} \tag{8}$$

Ideally, this error signal is [7]

$$\varepsilon = \frac{\hat{u}_c}{\omega_c}\frac{L_q-L_d}{4L_q L_d}\sin(2\tilde{\theta}_m) \tag{9}$$

where $\tilde{\theta}_m=\theta_m-\hat{\theta}_m$ is the estimation error of the rotor position.

Combined Observer

Figure 2:
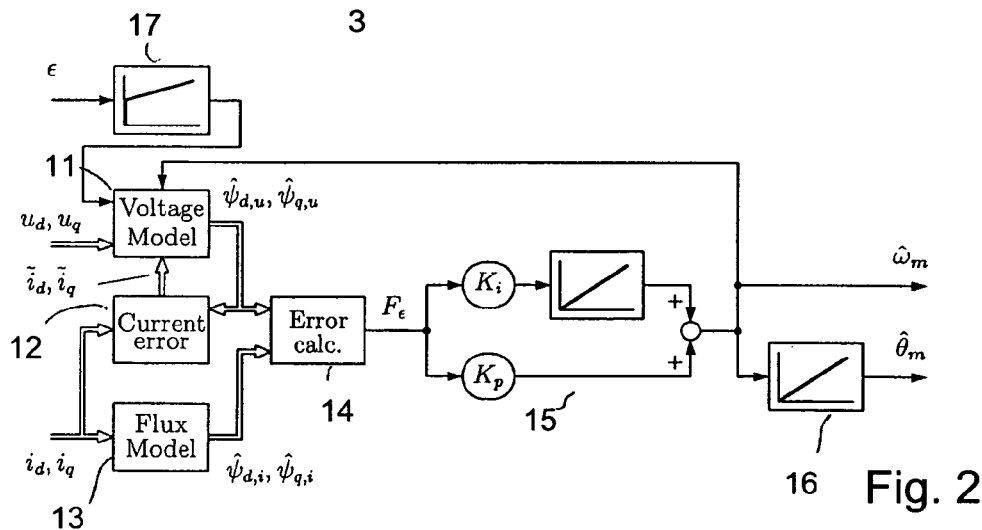
FIG. 2 shows a block diagram of the combined observer.

Due to errors in measurements and parameter estimates, the adaptive observer can lose correct orientation at low speeds. The flux vectors obtained by the voltage model and by the flux model can drift apart, and controlled operation is no longer possible. The method of the invention uses HF signal injection to correct the stator flux estimate so that correct orientation is maintained even at low speeds. FIG. 2 shows the adaptive observer enhanced with the error signal $\epsilon$ obtained by HF signal injection as explained above. The block diagram of the speed adaptation mechanism is also shown in the FIG. 2. FIG. 2 is similar to the FIG. 1 except that adaptation law 15 is shown as PI-mechanism including integrator and gains $K_i$ and $K_p$. Another integrator 16 is also added, which integrates the estimated speed $\hat{\omega}_m$ of the rotor to produce estimate for the position angle $\hat{\theta}_m$.

The stator flux estimate obtained by voltage model of equation (1) is augmented by the second error signal $\epsilon$ from equation (8) and a PI-type regulator shown in FIG. 2 as 17. The algorithm is given by $$\frac{d\hat{\psi}_{d,u}}{dt} = u_d - \hat{R}_s \tilde{i}_d + \hat{\omega}_m \hat{\psi}_{q,u} + \tag{10a}$$
$$\lambda_{re}\tilde{i}_d - \lambda_{im}\tilde{i}_q \hat{\omega}_m - \hat{\psi}_{q,u}\left(\gamma_p \varepsilon + \gamma_i \int \varepsilon dt\right)$$

$$\frac{d\hat{\psi}_{q,u}}{dt} = u_q - \hat{R}_s \tilde{i}_q + \hat{\omega}_m \hat{\psi}_{d,u} + \tag{10b}$$
$$\lambda_{re}\tilde{i}_q - \lambda_{im}\tilde{i}_d \hat{\omega}_m + \hat{\psi}_{d,u}\left(\gamma_p \varepsilon + \gamma_i \int \varepsilon dt\right)$$

where $\gamma_p$ and $\gamma_i$ are the gains of the PI-mechanism. The voltage model 11 of FIG. 2 includes thus equations (10a, 10b). The second error signal $\epsilon$ obtained by the HF signal injection keeps the estimates of the stator flux aligned. The second error signal $\epsilon$ is driven to zero in steady-state.

According to the invention, the signal injection is used only at low speeds. With increasing speed, the signal injection amplitude $\hat{u}_c$ and the gains $\gamma_p$ and $\gamma_i$ are decreased, reaching zero at a certain speed. The speed at which the amplitude and gains reach zero can be set by the end-user case-specifically depending on the machine size and other factors. The mentioned speed can be for example one fifth of the nominal speed of the machine. At low speeds, the combined observer relies both on the signal injection method and the adaptive observer. The signal injection method dominates in steady state whereas the adaptive observer commands at transients.

Control System

Figure 3:
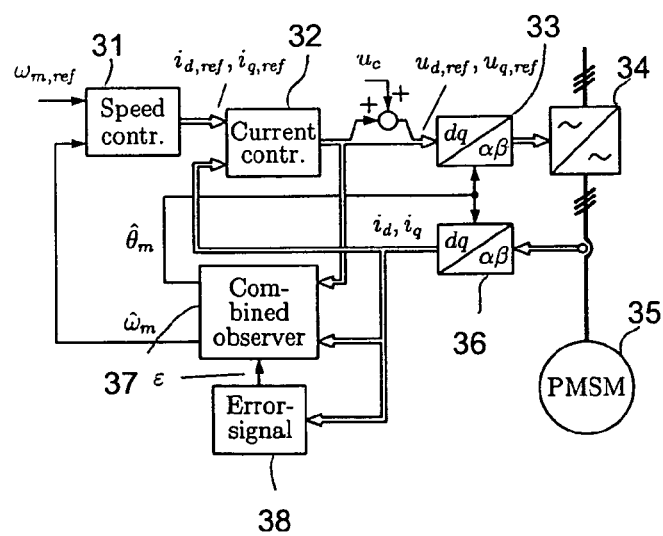
FIG. 3 shows an example of a control system utilizing the method of the invention.

When the proposed estimator is used for sensorless control of a PMSM, the entire control system comprising cascaded speed and current control is shown in FIG. 3. In FIG. 3 a speed controller 31 receives rotor speed reference $\omega_{m,ref}$ and outputs current references for the current controller 32. The control is carrier out in dq-coordinates. Current controller 32 outputs voltage references, which are transformed to $\alpha\beta$-coordinates in block 33. The inverter 34 is further controls the PMSM motor 35 according to the voltage references. Block 36 transfers measured currents into dq-coordinates, and the measured current components are fed back to current controller 32, to combined observer 37 and to error signal calculation block 36. Block 36 calculates error signal according to equation (8), and feeds it to the combined observer 37. The combined observer, which is shown in greater detail in FIG. 2, receives also voltage references from the output of the current controller 32. These voltage references correspond to the measured voltages, since the inverter can be considered as being almost linear amplifier. As in FIG. 2, the combined observer outputs accurate estimates for rotor speed and position. The rotor speed estimate is fed back to speed controller and the position estimate is used in coordinate transformations in blocks 33 and 36. Signal injection is done to the output of the current controller and especially to d component of the voltage reference.

It should be noted, that the described control system is only one possible system for controlling a PMSM based on the method of the invention. It will be obvious to a person skilled in the art that, as the technology advances, the inventive concept can be implemented in various ways. The invention and its embodiments are not limited to the examples described above but may vary within the scope of the claims.

REFERENCES

[1] E. Robeischl, M. Schroedl, and M. Krammer, "Position-sensorless biaxial position control with industrial PM motor drives based on INFORM- and back EMF model," in *Proc. IEEE IECON'02*, vol. 1, Sevilla, Spain, November 2002, pp. 668–673.

[2] C. Silva, G. M. Asher, and M. Sumner, "An hf signal-injection based observer for wide speed range sensorless PM motor drives including zero speed," in *Proc. EPE'03*, vol. 1, Toulouse, France, September 2003, pp. 1–9.

[3] M. Tursini, R. Petrella, and F. Parasiliti, "Sensorless control of an IPM synchronous motor for city-scooter applications," in *Conf. Rec. IEEE-IAS Annu. Meeting*, vol. 3, Salt Lake City, Utah, October 2003, pp. 1472–1479.

[4] A. Piippo, M. Hinkkanen, and J. Luomi, "Sensorless control of PMSM drives using a combination of voltage model and HF signal injection," in *Conf. Rec. IEEE-IAS Annu. Meeting*, Seattle, Wash., October 2004, in press.

[5] H. Kubota, K. Matsuse, and T. Nakano, "DSP-based speed adaptive flux observer of induction motor," *IEEE Trans. Ind. Applicat.*, vol. 29, no. 2, pp. 344–348, March/April 1993.

[6] G. D. Andreescu, "Position and speed sensorless control of PMSM drives based on adaptive observer," in *Proc. EPE'99*, Lausanne, Switzerland, September 1999, CDROM.

[7] M. Corley and R. D. Lorenz, "Rotor position and velocity estimation for a salient pole permanent magnet synchronous machine at standstill and high speeds," *IEEE Trans. Ind. Applicat.*, vol. 43, no. 4, pp. 784–789, July/August 1998.

The invention claimed is:

1. A method for sensorless estimation of rotor speed and position of a permanent magnet synchronous machine the method comprising the steps of forming a voltage model of the permanent magnet synchronous machine, forming a flux model of the permanent magnet synchronous machine, measuring stator currents of the permanent magnet synchronous machine, defining stator voltages of the permanent magnet synchronous machine, calculating first stator flux vector estimate ($\hat{\psi}_{d,i}+j\hat{\psi}_{q,i}$) using the flux model and measured stator currents, calculating second stator flux vector estimate ($\hat{\psi}_{d,u}+j\hat{\psi}_{q,u}$) using the voltage model and measured stator voltages, comparing the directions of the first and second flux vectors to achieve a first error signal ($F_e$), using speed adaptation to achieve estimates for the rotor angular speed ($\hat{\omega}_m$) and angular position ($\hat{\theta}_m$) from the first error signal ($F_e$), using the estimate for the rotor angular speed ($\hat{\omega}_m$) in the voltage model, injecting a known voltage signal ($u_c$) to the stator voltage, the magnitude of the voltage signal depending on the rotor speed such that the magnitude is decreased when the rotor speed increases and the magnitude reaches zero at a predefined rotor speed, detecting a current signal ($i_{qc}$) from the stator current to form a second error ($\epsilon$) signal, which is dependent on the estimation error of the rotor position, and augmenting the voltage model by the second error signal ($\epsilon$) to keep the first and second flux vector estimates aligned and so to correct the rotor angular speed ($\hat{\omega}_m$) and angular position ($\hat{\theta}_m$) estimates.

2. A method according to claim 1, wherein the step of augmenting the voltage model comprises steps, in which the second error signal is fed to a PI-controller, the output of which is used to correct the second flux vector estimate.

3. A method according to claim 2, wherein the gains of the PI-controller are decreased when the rotor speed increases and the gains reach zero at the predefined rotor speed.

* * * * *